(12) United States Patent
Jitaru (10) Patent No.: US 10,205,397 B2
(45) Date of Patent: Feb. 12, 2019

(54) SOFT SWITCHING ON ALL SWITCHING ELEMENTS CONVERTER THROUGH CURRENT SHAPING "BUCHAREST CONVERTER"

(71) Applicant: Ionel Jitaru, Tucson, AZ (US)

(72) Inventor: Ionel Jitaru, Tucson, AZ (US)

(73) Assignee: ROMPOWER TECHNOLOGY HOLDINGS, LLC, Milford, DE (US)

( * ) Notice: Subject to any disclaimer, the term of this patent is extended or adjusted under 35 U.S.C. 154(b) by 0 days.

(21) Appl. No.: 14/796,204

(22) Filed: Jul. 10, 2015

(65) Prior Publication Data

US 2016/0020701 A1 Jan. 21, 2016

Related U.S. Application Data

(60) Provisional application No. 62/023,025, filed on Jul. 10, 2014.

(51) Int. Cl.
*H02M 3/335* (2006.01)
*H02M 1/00* (2006.01)

(52) U.S. Cl.
CPC ... *H02M 3/33546* (2013.01); *H02M 3/33576* (2013.01); *H02M 2001/0058* (2013.01); *Y02B 70/1491* (2013.01)

(58) Field of Classification Search
CPC ......... H02M 2001/0058; H02M 3/335; H02M 3/33576; H02M 3/33592; H02M 7/217; H02M 2001/0048; H02M 3/33507; H02M 3/33523; H02M 3/33569; Y02B 70/1433; Y02B 70/1475

See application file for complete search history.

(56) References Cited

U.S. PATENT DOCUMENTS

| | | | | | |
|---|---|---|---|---|---|
| 4,953,068 | A | * | 8/1990 | Henze | H02M 3/33584 363/127 |
| 6,061,255 | A | * | 5/2000 | Chik | H02M 3/33592 363/21.06 |
| 6,771,521 | B1 | * | 8/2004 | Xiong | H02M 1/34 363/21.06 |
| 7,548,435 | B2 | * | 6/2009 | Mao | H02M 3/156 323/266 |
| 2005/0226009 | A1 | * | 10/2005 | Jitaru | H02M 3/28 363/17 |
| 2006/0098465 | A1 | * | 5/2006 | Fronk | H02M 3/33576 363/21.06 |
| 2010/0232180 | A1 | * | 9/2010 | Sase | H02M 3/33576 363/17 |

* cited by examiner

*Primary Examiner* — Gary L Laxton
(74) *Attorney, Agent, or Firm* — Yakov S. Sidorin; Quarles & Brady LLP

(57) ABSTRACT

A method is shown to create soft transition in selected topologies by controlling and designing a current pulse injection in front of the output choke to overwhelm the output current at a certain point in the switching cycle.

15 Claims, 13 Drawing Sheets

SOFT SWITCHING ON ALL SWITCHING ELEMENTS CONVERTER THROUGH CURRENT SHAPING "BUCHAREST CONVERTER"

RELATED APPLICATION/CLAIM OF PRIORITY

This application is related to and claims priority from U.S. provisional application Ser. No. 62/023,025, filed Jul. 10, 2014, which provisional application is incorporated by reference herein.

1. INTRODUCTION

The present invention further develops original concepts that have been described in two previous applications, one entitled "Soft Switching on all Switching Elements Two Transistors Forward Converter" PCT patent application serial number PCT/US14/37736, filed May 12, 2014 and the other entitled "Soft Switching Converter by Steering the Magnetizing Current", U.S. patent application Ser. No. 14/274,701, filed May 10, 2014, copes of which are attached as Exhibit A and Exhibit B, respectively, and each of those applications is incorporated by reference herein.

In both previous applications is obtained soft switching in the secondary and the primary. In one of the claims in "Soft Switching on all Switching Elements Two Transistors Forward Converter" patent application (Exhibit A), a current source is injected at the node where the synchronous rectifiers and output choke connect with the purpose to address the current need of the output choke and the additional current injected to reverse the current flow through SR2, FIG. 8 of Exhibit A. Once the current through SR2 is reversed the SR2 is turned off and the negative current is transferred to the primary to discharge the parasitic capacitance of the primary switches to zero and create zero voltage turn on conditions for the primary switching elements. The current injection is done for a very short time prior the primary switches turns on. The current injection can be rectangular, trapezoidal, triangular, half sinusoidal or any other shape as long as it is narrow and has the proper amplitude. The goal is to overwhelm the current demanded by the output choke for a short time period prior the primary switches turn off. This can be thought as a method of disconnecting the output choke from the rectifier means for a very short period of time and forcing the SR2 to turn off at zero or a controlled small negative current.

In most of the embodiments presented in the Exhibit A and also in the Exhibit B, the soft switching in the primary and secondary is accomplished by controlling the level of the magnetizing current through frequency modulation in such a way that the magnetizing current will exceed the level of the output current by a controlled amount prior the primary switches will be turn on. In FIG. 4 of "Soft Switching Converter by Steering the Magnetizing Current" which is Exhibit B, the magnetizing current at "t5" exceeds the current flowing through the output choke and as a result the current through the SR2 becomes negative prior SR2 is turned off. When SR2 is turned off the excess current above the level of the current demanded by the output choke is transferred in the primary discharging the parasitic capacitance of M1 to zero and creating zero voltage switching conditions. In Exhibit A the current injection concept is described and applied only to two transistor forward topology. In the present application we apply this concept to many other topologies and describe several concepts of implementing such a current injection circuit. The method described in Exhibit B and many of the embodiments of Exhibit A, by controlling the level of magnetizing current to exceed the current flow through the output choke have some limitations. The method does work well for lighter loads but for very high currents the magnetizing current has to be increased to very high levels which will increase the conduction losses in the primary and secondary.

2. SUMMARY OF THE PRESENT INVENTION

The method described in this application accomplishes the same goals of obtaining soft switching in the secondary and primary but without the penalty associated with a significant increase of the circulating current both in primary and secondary. The method is described with reference to the accompanying figures.

DETAILED DESCRIPTION

The concepts of the present invention comprises injecting a very narrow shaped current with an amplitude larger than the current flowing through the output choke by a controlled amount just before the primary switches will turn on by a determined amount of time in advance. The additional conduction losses associated by the current injection is designed to be much lower than the conduction losses associated by an increase level of the magnetizing current in order to exceed the output current. For that reason the current source which is used for current injection has to produce a narrow and high amplitude current shape. In this patent application we present several methods to create such a current shape. To maintain a good efficiency of the converter over the entire loading conditions the amplitude of the current injection has to be modulated proportional with the output current.

Figure 1:
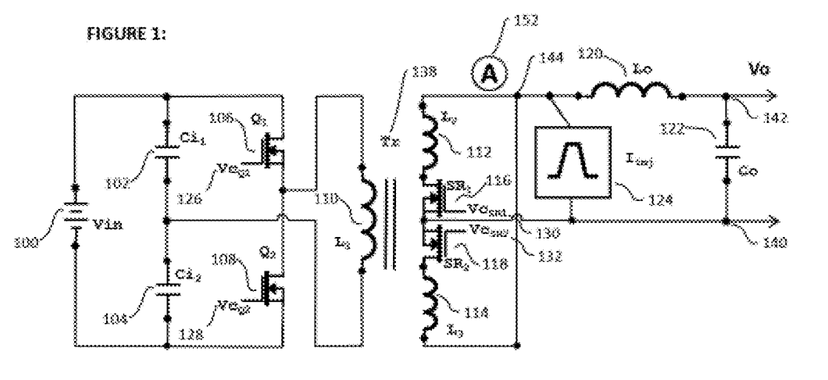
FIG. 1 presents a half bridge topology that implements the principles of the present invention.

In FIG. 1 is presented a half bridge topology using the transformer, Tr, 138, with a primary winding, 110, and two secondary windings 112 and 114. Two synchronous rectifiers, 116 and 118 are used as rectifiers means though the concept would also apply, within certain boundaries, even if two diodes would be used as a rectifier means. The synchronous rectifiers are placed with the source to the ground for a more convenient drive. An output inductor, 120, is placed between the common point of the winding and the output capacitor 122. In the primary there are two switching elements, 106 and 108, two capacitors in series, 102 and 104 with the common node connected to the primary winding of the transformer wherein the other end of the primary winding is connected to the common node of the primary switching elements, 106 and 108. An input voltage source 100 is placed across the bridge formed by the input capacitors and the primary switching elements. This topology is very well known in the industry as a half bridge topology with the secondary center tap. A current source, 124, is added to this topology and placed between the output ground, 140, and the common connection of the secondary windings and the output choke, node label as "A", 144. The current source, Iinj, 124, is designed to inject a narrow current into "A", 144, with an amplitude equal or larger than the current flowing through output inductor 120 at a determined moment in the operation cycle.

Figure 6:
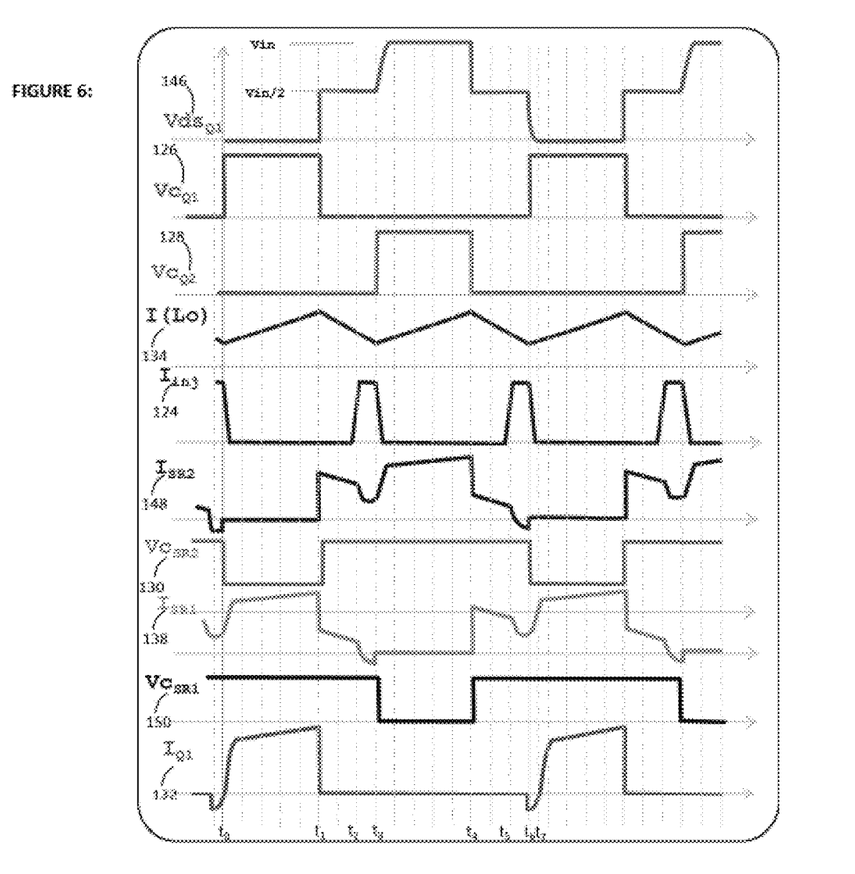
FIG. 6 presents the key waveforms and the timing which characterizes the operation of a topology that implements the principles of the present invention.

In FIG. 6 is presented the key waveforms and the timing which characterizes the operation of this topology.

The key waveforms which are depicted in FIG. 6, are the following: The voltage Vds(Q1), 146, across Q1, 106; the control signal VcQ1, 126, for the upper primary switch Q1,106; the control signal VcQ2,128, for the lower primary switch Q2, 108; the current I(Lo), 134, flowing through output inductor, Lo, 120; the current source, Inj, 124; the current ISR2,148, through the SR2, 118; the control signal VcSR2, 130, for the SR2 118; the current IQ1,132, through Q1,106; the current ISR1, 136, through SR1,116.

At the time t0, Q1 is turned on at zero voltage switching conditions as depicted by the Vds(Q1), 146. Between t0 to t1, Q1, 106, is on and the energy is transferred to the secondary in a forward mode through SR1, 116, secondary winding, 112 and further through Lo, 120, to the output 142.

At the time t1, Q1 is turned off. The input voltage is divided in between Q1 and Q2 in primary. In secondary the output current I (Lo), 134, will flow further through SR1, 116, and Sr2, 118. This mode of operation is also known in the field as "dead time" which will last until t3.

At t2 the current source, 124, is activated. The amplitude of this current source is controlled to be higher than the current through Lo, 120 at that moment. The difference between the current injected, 124, and the current through Lo is subtracted form the current flowing through SR2 as depicted in ISR2, 148. The difference of current between the current source, 124 and the current through the Lo is also subtracted from the current flowing through SR1. The current through SR1, becomes negative and SR1, 116, is turned off at t3. The negative current which was flowing through SR1 after SR1 is turned off will continue to flow into the primary discharging the parasitic capacitance of Q2 towards zero and creating zero voltage conditions for Q2 at t3 when Q2 is turned on.

Between t3 and t4, Q2 is on and the energy is transferred from primary to secondary in the forward mode through the secondary winding 114, and SR2, 118 and further through Lo towards 142.

At t4 the Q2, 108 is turned off. The current through circulating through Lo is going to flow now through both synchronous rectifiers, SR1 and SR2.

At t5 the current source, 124, is activated. The amplitude of this current source, 124, is controlled to be higher than the current through Lo, 120 at that time. The difference between the current injected, 124 and the current through Lo is subtracted form the current flowing through SR1 as depicted in ISR1, 136. The difference of current between the current source, 124 and the current through the Lo is also subtracted from the current flowing through SR2. The current ISR2, 148, through SR2, becomes negative when SR2 is turned off at t6. The negative current which was flowing through SR2 after SR2 is turned off will continue to flow into the primary discharging the parasitic capacitance of Q1 towards zero and creating zero voltage conditions for Q1 at t7 when Q1 is turned on.

At t7, Q1, 106, is turned on at zero voltage switching conditions. In conclusion the source, 124 has to be activated at the determined time, t2 and t5, and has to have right amplitude which shall be higher than the current flowing through Lo, 120, at that time. The difference between the current source, 124 and the current flowing through Lo, I(Lo), 134, is set by control mechanism to be large enough to discharge the parasitic capacitance of the primary switches but not much larger than this in order to minimize the additional conduction losses associated with the current source.

Figure 7A:
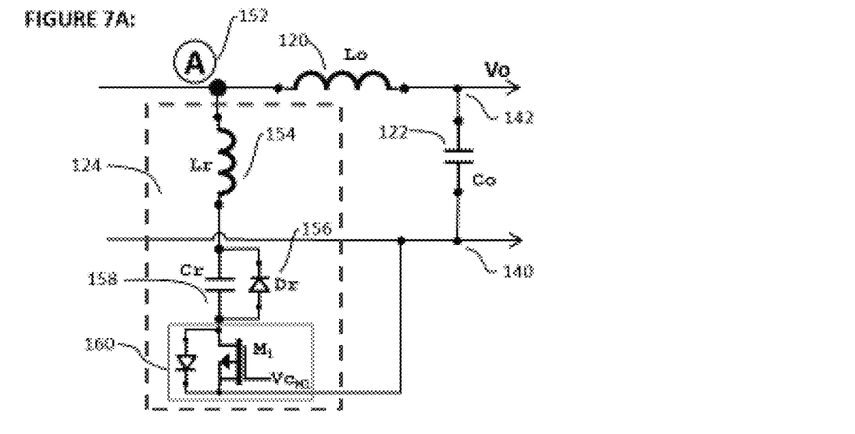
FIG. 7A presents a potential implementation of the current source for a topology that implements the principles of the present invention.

In FIG. 7A is presented a potential implementation of the current source. Is formed by an inductive element Lr, 154, a capacitor element Cr, 158 a clamp rectifier Dr, 156 and a P channel mosfet 160. The P channel mosfet can be replaced by an N channel mosfet if floating drive is used. Very important in this circuit is to exhibit a very low capacitance between "A" and ground, 140. It is suggested that in such application the switching element 160, shall be a mosfet with a low capacitance such as a GANs.

Figure 8A:
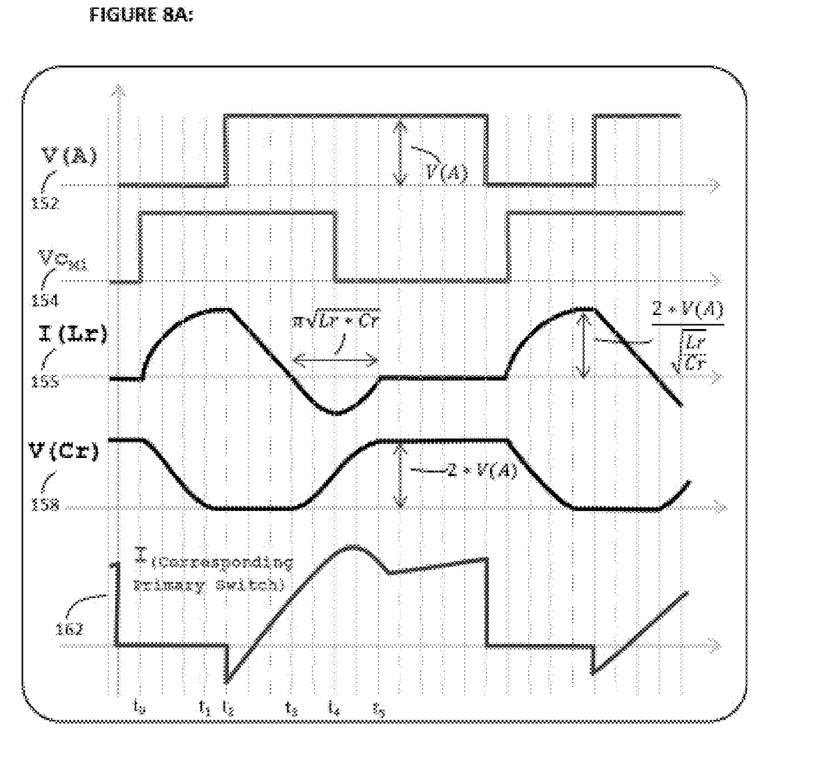
FIGS. 8A, 8B and 8C depict waveforms for the implementations of FIGS. 7A-7D.

In FIG. 8A, are depicted the following waveforms: the voltage in point "A", 152; the signal which controls the mosfet, 160 is VCM1, 154; the current through the resonant inductor Lr, which is I(Lr),155; the voltage across the Cr, V(Cr),158; the current through the corresponding switch in the primary, 162.

As presented in FIG. 8A, at to the Mosfet M1, 160 are turned on at t0. At that time the voltage across the Cr, 158, is charged at the voltage twice the voltage in "A" during the conduction of one of the primary switches. The current through the resonant circuit formed by Cr, 158, and Lr, 154, starts to flow in a sinusoidal shape until reaches its peak at t1 while the voltage across the Cr, 158, will discharge to zero. The voltage across Cr is clamped to near zero by Dr, 156; as a result the voltage across Cr, 158, will stay at zero level between t1 and t2. At t2 the voltage in point "A" will go high and the current through Lr, 154, will decrease linearly from t2 to t3 through the clamp diode Dr, 156 and the M1, 160. At t3 the current is changing polarity and it will be shaped in a sinusoidal form due to the resonance between Lr, 154, and Cr, 158. In the end of the resonance cycle the capacitor Cr, 158, is charged again to a voltage which is twice the voltage in "A", storing the energy for the next cycle. The mosfet M1, 160, can be turned off somewhere between t3 and t5, preferable closer to t5 to minimize the body diode conduction. In principle, the resonant capacitor, Cr, 158, is charged between t3 to t5 and that energy is used to create the injection current, 124, for the next cycle. After each synchronous rectifier turns off at negative current, the current through the primary switches looks as depicted in FIG. 8A, as 162.

To control the amplitude of the current injection of the current source 124, the control signal VCM1 is shifted versus the waveform in point "A". To decrease the peak current injection of 124, the time interval between t0 to t2 is decreased. The duration of VCM1, 154, should be also modulated and decrease if the peak current in 124 is decreased. In many implementations, for light loading conditions the magnetizing current is used to exceed the output current as per applications from Exhibit A and Exhibit B. For medium and higher current the time interval between t0 to t2 is modulated in order to modulate the amplitude of the current, I (Lr), 156. Due to the resonant nature of this circuit there is limited control on the modulation of I(Lr), 156.

Figure 7B:
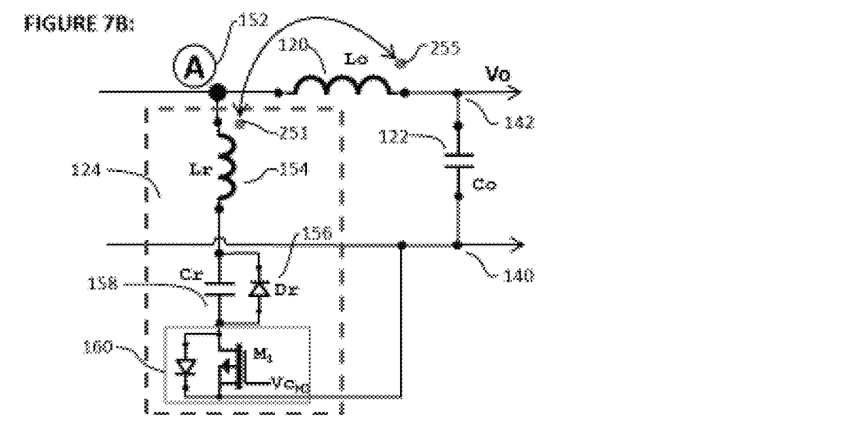
FIG. 7B presents a circuit that is capable of better control of the peak current injection of the current source, in a topology that implements the principles of the present invention.

The circuit presented in FIG. 7B is capable of better control of the peak current injection of the current source, 124. In FIG. 7B there is a coupling between the output choke Lo, 120 and the resonant inductor, Lr, 154. The coupling coefficient is function of the specific design implementation. The polarity of the couple is done in a way that a positive voltage towards "A' will be induced in Lr during the time "A" is low. This means that additional energy will be transferred to the resonant circuit during its operation, energy coming from the output.

Figure 7C:
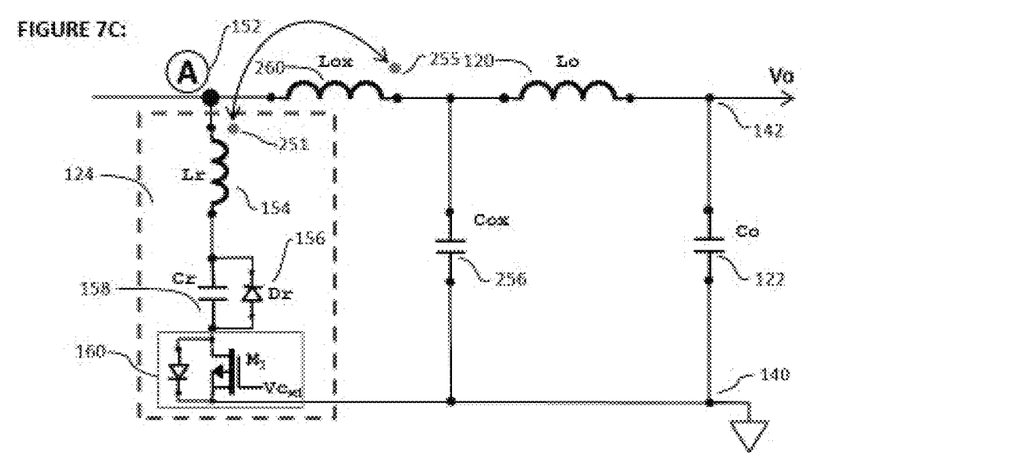
FIG. 7C depicts another method of implementation of the concept presented in FIG. 7B.

In FIG. 7C is depicted another method of implementation of the concept presented in FIG. 7B. In FIG. 7C the coupling is done between Lr, 154, and Lox, 260. A filter capacitor Cox, 256, is placed after Lox and further connected to Lo, 120 and Co, 122. In this implementation the current ripple through Lo is not impacted by the pulsing currents flowing through Lr.

Figure 7D:
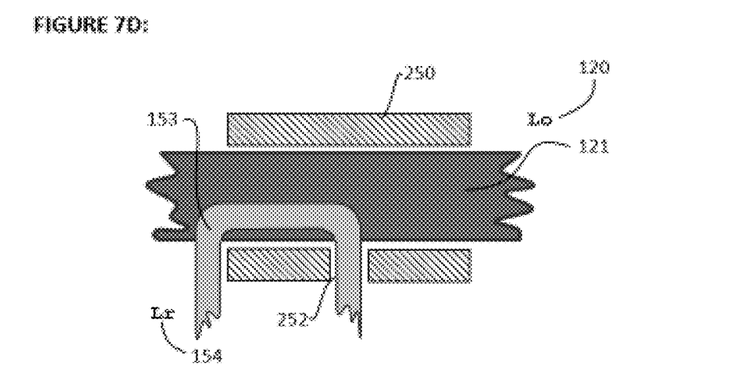
FIG. 7D depicts a potential practical implementation of the concept described in FIG. 7B.

In FIG. 7D we have a potential practical implementation of the concept described in FIG. 7B. The coupling between Lo, 120, and Lr, 154, is controlled by the placement of the slot in the core, 252. The magnetic core 250 is placed around the trace 121 which forms the output inductor Lo, 120. Another trace is overlapped with 121, which is 153, and forms Lr, 154. The symbolic dots, 255 and 251 show the coupling polarity between Lo, 120, and Lr, 154.

Figure 7E:
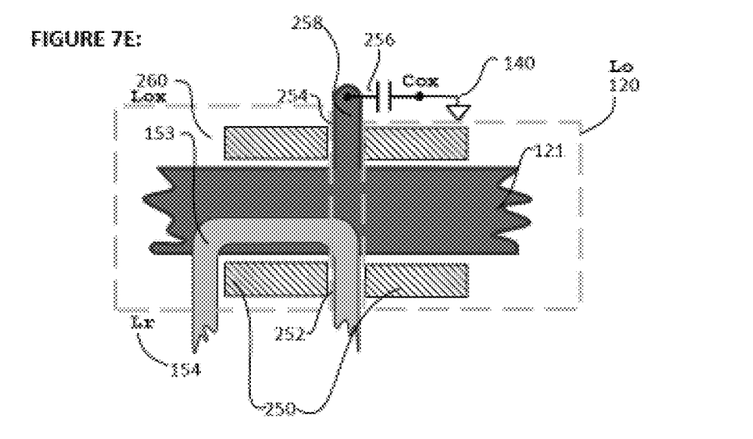
FIG. 7E schematically illustrates a hardware component configured to implement the method of FIG. 7C.

A potential implementation of the concept described in FIG. 7C is depicted in FIG. 7E. The Main trace which is conducting the current towards output has a connection going to Cox, 256, through a slot 254 in the core, 250. The trace 258, electrical connected to 121 connects to Cox, 256. The other slot in the core 250 is 252 through each the Lr, 154, penetrates.

Figure 8B:
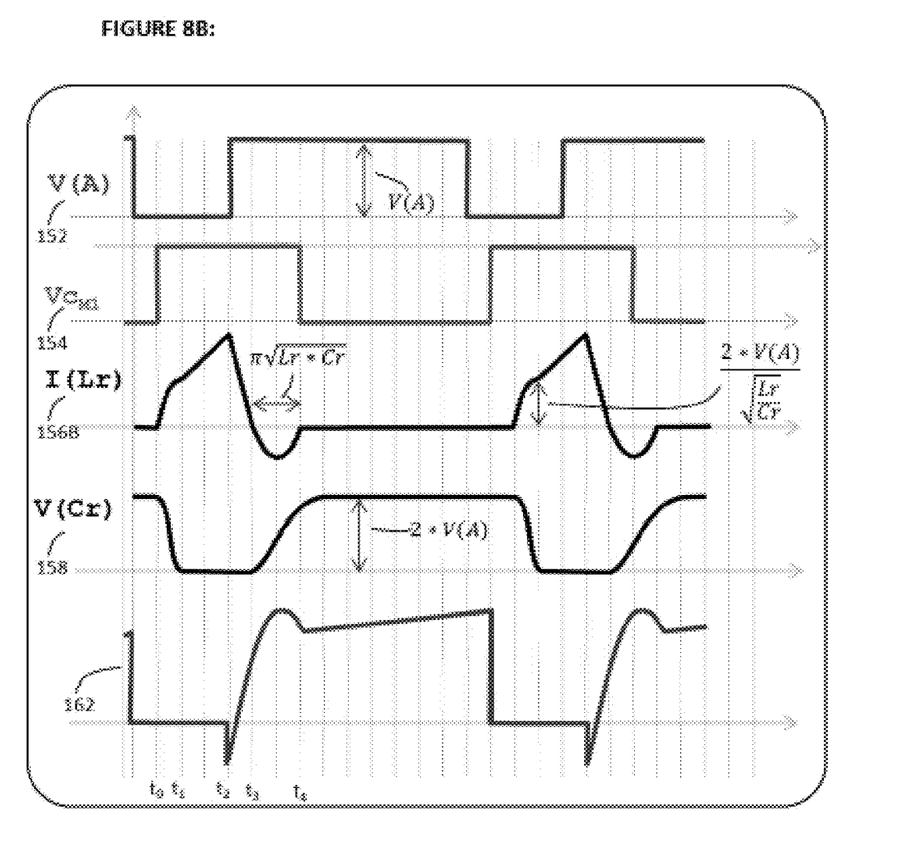

In FIG. 8B are presented the key waveforms of the circuit presented in FIG. 7B. There are some similarities with the key waveforms depicted in FIG. 8A, with the difference of the current shape through Lr. There are some differences in the mode of operation due to the coupling between Lr, 154, and Lo, 120. During t0 to t1 besides the resonance between Lr and Cr there is the effect of the coupling wherein an additional voltage source is induced in the Lr building the current through Lr in addition to the resonance. At t1 the resonance ended but the current is further building up due to the voltage source induced by the coupling between Lr and Lo. In this implementation if the time interval between t0 to t2 is modulated there is a significant modulation of the peak current through Lr. By design in this implementation the Cr is decreased to decrease the energy contained in the resonant circuit due to the fact that some of the energy in the resonant circuit is deliver by the output choke due to its coupling.

Figure 8C:
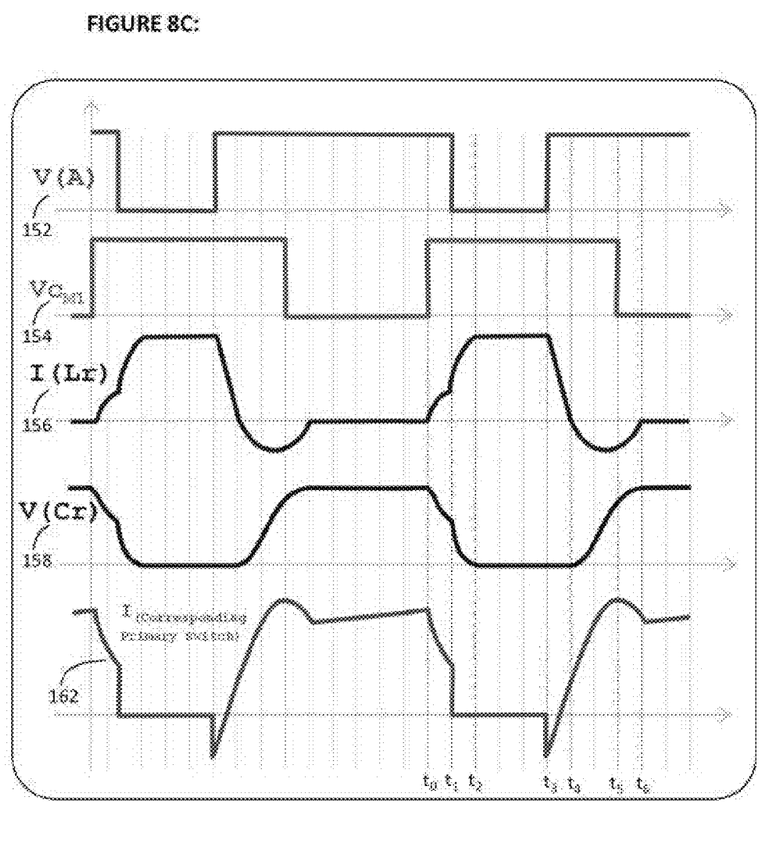

In FIG. 8C we apply the concept described in 7A, wherein the timing of the control signal for M1 is modified, and M1 is turned on when the voltage in "A" is still high. As a result between t0 and t1 as presented in FIG. 8C the resonant circuit formed by Lr and Cr is activated and the current is built up as depicted by I (Lr) of FIG. 8C. The current built up through the resonant circuit is shaping the current through the synchronous rectifiers and the current in the primary, 162. Using this technique we can shape not only the current at turn on through the primary switches but also the current at turn off. A lower current at turn off through the primary switches will decrease also the turn off losses in the case IGBT devices are used. By controlling the shape of the primary switches at turn on and at turn off, we have created a topology superior to the resonant converters, due to the rectangular shape of the current, which means a lower RMS current while maintaining ZVS at turn on for the primary switches, zero, or lower current at turn off for the primary switches, and zero current turn off for the secondary rectifier means. Another advantage of this topology by comparison with the resonant converters is the fact that the operation is done at general constant frequency.

Figure 2:
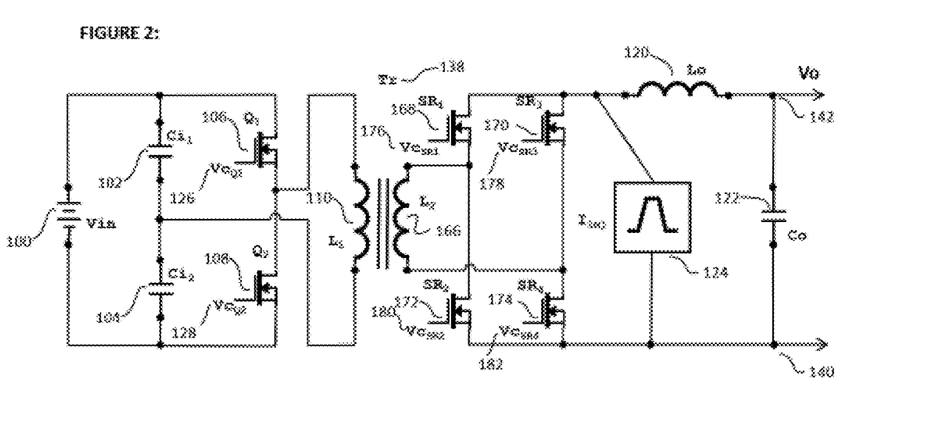
FIG. 2 presents a half bridge using a full bridge rectification configuration, that implements the principles of the present invention.
Figure 3:
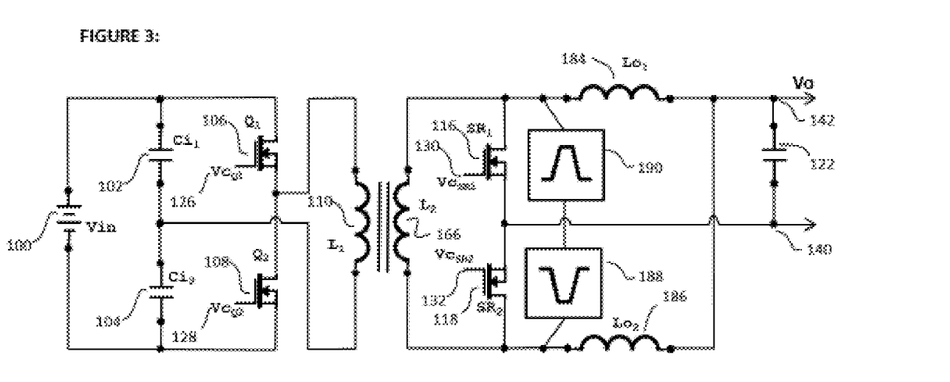
FIG. 3 presents a half bridge topology with current double configuration in the secondary, that implements the principles of the present invention.

The same concept of current injection by using a shaped current source can apply to other configurations. In FIG. 2 is presented a half bridge using a full bridge rectification configuration wherein a current shaped current source, 124, is placed at the front of the output inductor. The mode of operation is the same as the configuration using a center tap topology depicted in FIG. 1. In FIG. 3 there is presented a half bridge topology with the current double configuration in the secondary. In the current doubler configuration two output chokes are employed. The current injection in this case is performed by two shaped current sources 190 and 188. Like in the center tap topology the amplitude of the current through each shaped current sources is controlled to be higher than the current through each choke by a determined amount to ensure the discharge of the parasitic capacitances of the primary switches towards zero.

In this topology there are two current injection circuits, one for each synchronous rectifier, SR1 and SR2. This placement of the current injection circuits in the drain of the synchronous rectifiers can apply also to any other topology though for simplicity in our drawings we placed just one current source placed in point "A" prior of the output choke.

Figure 4:
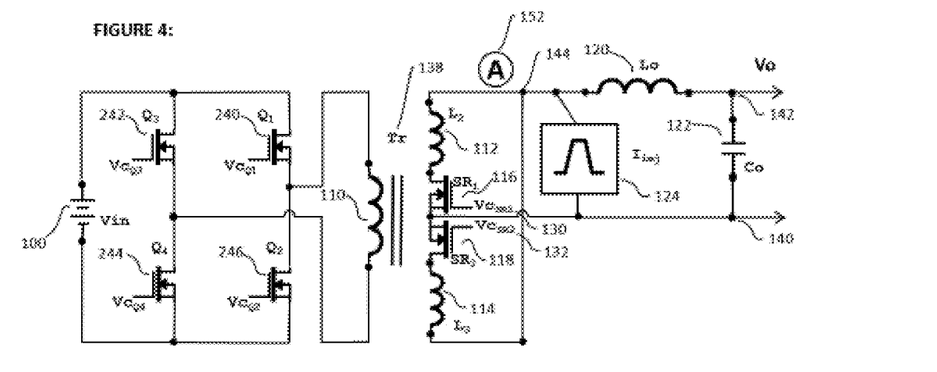
FIG. 4 presents the center tap topology of the secondary and a full bridge configuration in the primary, in accordance with the principles of the present invention.

In FIG. 4 is presented the center tap topology of the secondary and a full bridge configuration in the primary. The mode of operation is the same as a half bridge. The full bridge configuration in the primary can be further used with the previous secondary configuration such as current doubler or full bridge rectification.

Figure 5A:
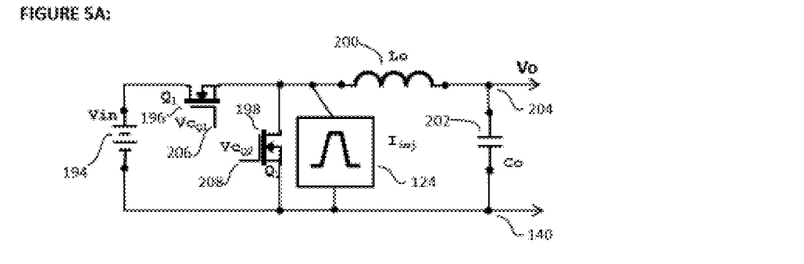
FIG. 5A presents a buck converter using the current injection concept, in accordance with the principles of the present invention.

In FIG. 5A is presented a buck converter using the current injection concept. The shaped current source is activated when Q2 is in conduction at a determined time before Q1 will turn on. The amplitude of the current injection has to be larger than the current through L, 200, by a determined amount in such way that the current difference will be enough to discharge the parasitic capacitance of Q1 creating zero voltage switching conditions for Q1.

Figure 5B:
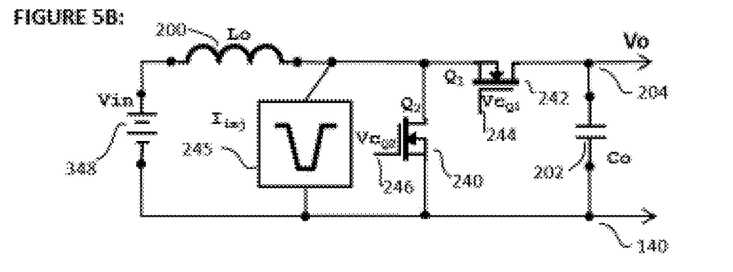
FIG. 5B presents a boost converter with the current injection, in accordance with the principles of the present invention.

In FIG. 5B is presented a boost converter with the current injection. In this case the current injection is pulling out the current from the input choke to turn off Q1 under controlled conditions and to further discharge the parasitic capacitance of Q2 to zero. In this way we eliminate the cross-conduction between Q1 and Q2 and achieve zero voltage switching conditions fro Q2.

The soft switching technology described in the previous embodiments do create soft switching conditions in the secondary by turning off the rectifier means at zero or slight negative current and soft switching conditions in the primary by creating zero voltage conditions at turn on for the primary switches. The ringing across the primary switches during the dead time created by the leakage inductance and the parasitic capacitances of the primary switches and the transformers is not eliminated. That leads to circulating energy in the circuit which will lead to additional power dissipation and noise in the system. One solution is to use magnetic designs which minimize the leakage inductance and as a result the energy contained in it.

Figure 9:
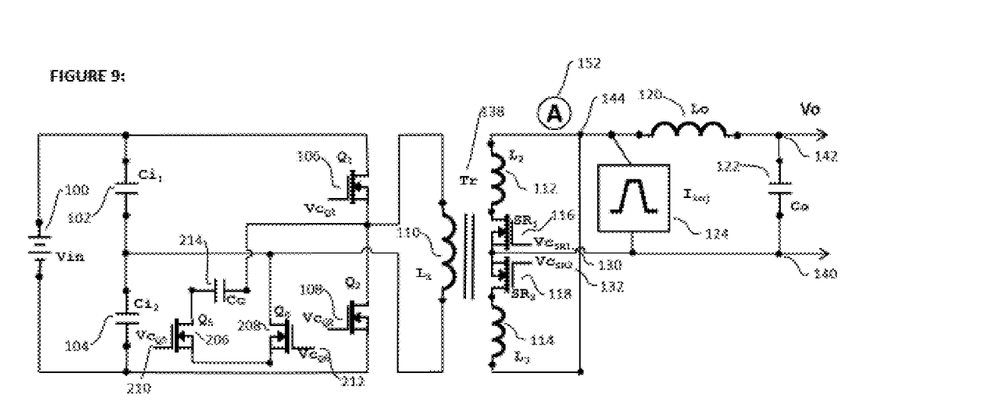
FIG. 9 presents another circuit that implements the principles of the present invention.

Another method is presented in FIG. 9 wherein a clamped circuit formed by two switches back to back Q5 and Q6 and a clamp capacitor Cc. In this circuit the current flowing through the leakage inductance when one of the primary switches turns off will be transferred into the clamped capacitor. This circuit can operate in several modes. One mode is to have a larger clamped capacitor value in a way that the current through the leakage inductance does decay during the dead time but not fully to zero. In the end of the dead time when the clamped bidirectional switch formed by Q5 and Q6 opens the current in the leakage inductance will discharge of the parasitic capacitance of the primary switches towards zero, creating zero voltage switching conditions for the primary switches.

Figure 10:
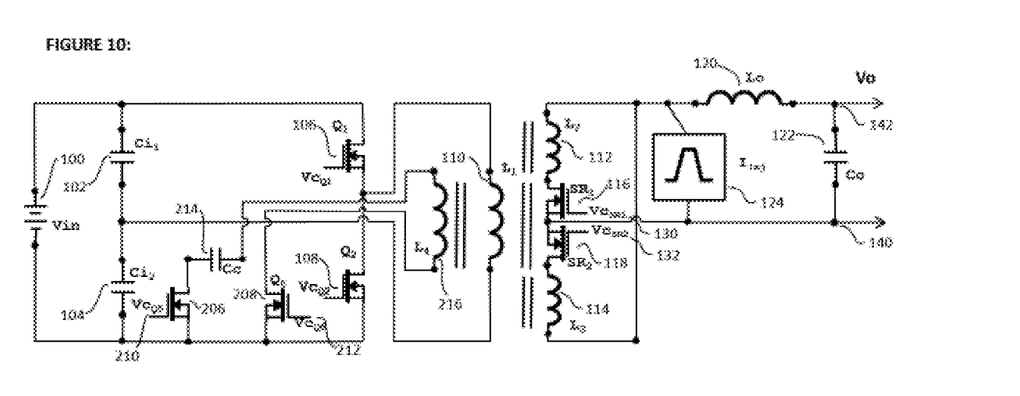
FIG. 10 presents a clamped circuit that implements the principles of the present invention.

In FIG. 10 is presented the clamped circuit wherein the bidirectional switch formed by Q5 and Q6 and the clamped capacitor Cc, is placed on a separate winding which has to be coupled well with the primary winding. The advantage of this concept is the fact that the switching devices, Q5, 206, and Q6, 202, are controlled from the ground level and not floating as in FIG. 9. The additional winding L4, 216 can be used also as a shield between the primary and secondary.

Figure 11:
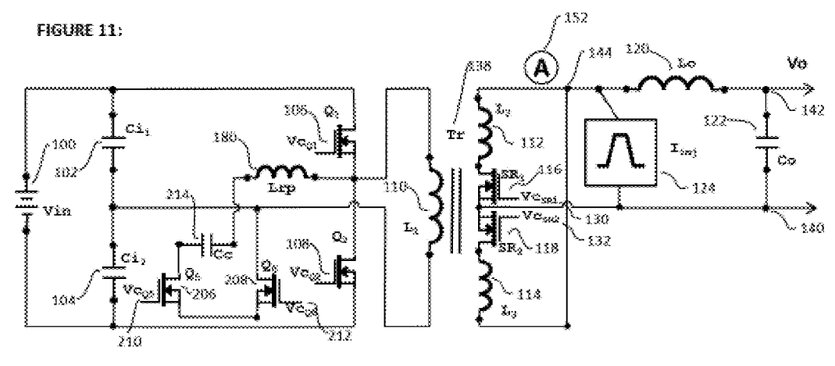
FIG. 11 presents the circuit from FIG. 9 with an additional inductor element added in series with the clamped capacitor.
Figure 12A:
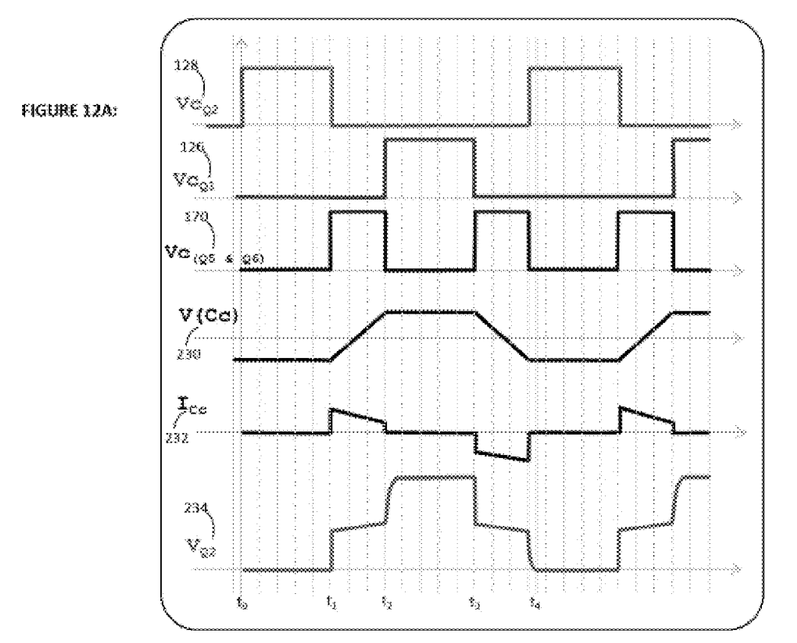
FIGS. 12A and 12B depict waveforms for the circuits of FIGS. 10 and 1, respectively.
Figure 12B:
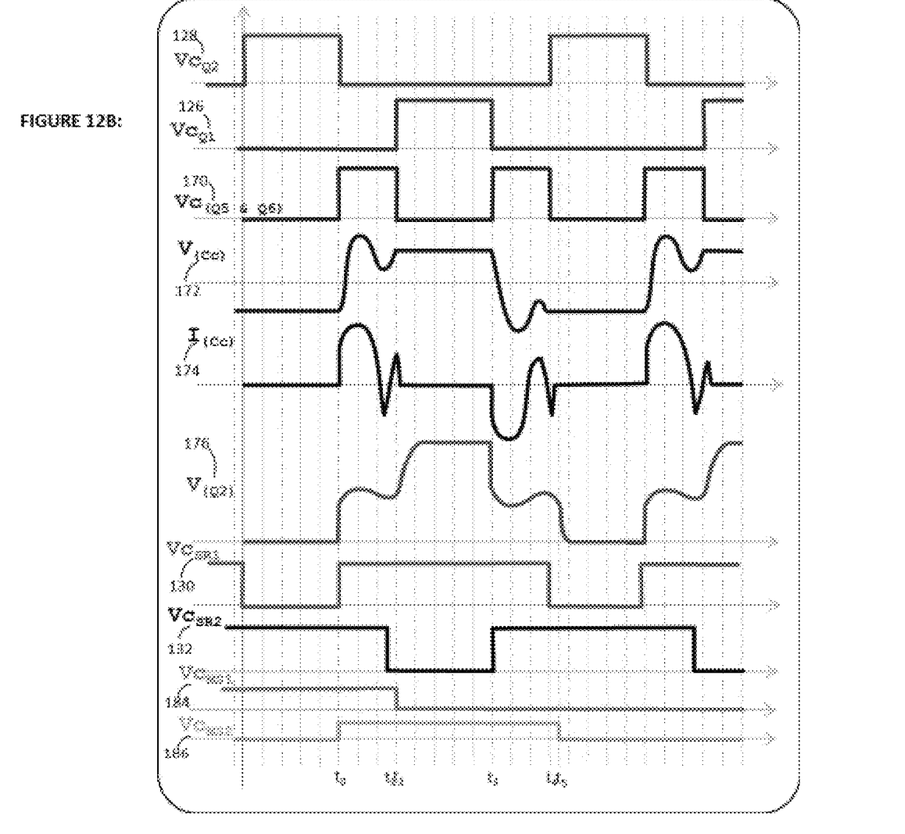
Figure 12C:
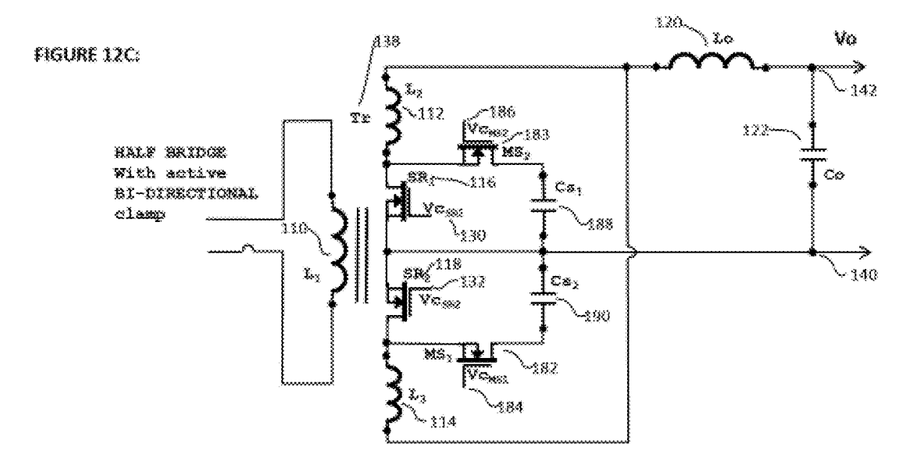
FIG. 12C presents a circuit similar to FIG. 9, using a half bridge with bi-directional clamp.

In FIG. 11 is presented the circuit from FIG. 9 wherein an additional inductor element is added in series with the clamped capacitor Cc, for the purpose to obtain a resonant tank and to be used to achieve the same function as the current injection circuit. This additional inductor element Lrp, 181 can be implemented also in the circuit from FIG. 10. There are different ways the clamped circuit can operate. The simplest way is described in FIG. 12A. In FIG. 12A there are presented several key waveforms: the controlled signal for Q2, VCQ2, 128; the control signal for Q1, VCQ1, 126 the bidirectional switch formed by Q5 and Q6, wherein the high level of the waveforms symbolizes the conduction time; the voltage across Cc, 230; The current through Cc, 232; the voltage across Q2, 234. As depicted in FIG. 12A, between t0 to t1 Q2 is on and the voltage across Q2 is zero. At t1, Q2 turns off and the voltage across it build up and when the bidirectional switch formed by Q5 and Q6 is conducting and the current flowing through the leakage inductance is steered through the clamp capacitor Cc, 214. The voltage across the clamp capacitor is building up while the current through Cc is decaying as can be seen in the waveforms, 230 and 232. At the end of t2, there is still current in the leakage inductance and that current is designed to be enough to discharge the parasitic capacitance across Q1, creating zero voltage switching conditions for Q1. In some prior art there is no capacitor and practically the primary winding is shorted for the period of dead time, in FIG. 12A, that being the time interval between t1 to t2. In another prior art, described by Ionel Jitaru at PCIM Conference in Nuremberg on May 25, 1998, page 61, the clamped capacitor and the bidirectional switch is implemented. As presented in the seminar, a larger leakage inductance is needed to delay the current in the secondary and accomplish zero voltage switching in the primary. In this prior art there is no zero current turn off through the rectifier means in the secondary as presented in this application. To obtain zero current at turn off through the rectifier means in the secondary a larger magnetizing current, larger than the output current can be employed or the current injection method which is one of the main embodiment of this application. In FIG. 12B is presented a concept wherein the sizing of the Cc is done in such a way that the clamp circuit is used to obtain both goals, such as the storage of the energy contained in the leakage inductance and use some of that energy to reverse the current through the rectifier means and turn off the rectifier at zero or negative current. The energy left should be used to discharge the parasitic capacitance of the primary switches in order to obtain zero voltage switching conditions. The waveforms presented in FIG. 12B require a slight change in the circuit presented in FIG. 1, wherein the current source, 124 is eliminated and two clamped circuits are placed across the secondary rectifier means, SR1, 116 and SR2, 118. These two clamp circuits are formed by Ms1, 182, and Cs2, 190 for the SR2 and Ms2, 184, and Cs2, 188, for the SR1. The key waveforms are presented in FIG. 12B.

In FIG. 12B we have the following waveforms: Control signal for Q2, VCQ2,128; Control signal for Q1, VCQ1, 126; the conduction time for the bidirectional switch formed by Q5 and Q6, 170; the voltage across the clamp capacitor Cc, 214; the current through the clamped capacitor Cc,214; the voltage across the primary switch Q2,108; the control signal for SR2, VCSR2, 132; the control signal for SR1, VCSR1,130; the control signal for MS1, VCMS1,184; the control signal from MS2, VCMS2,186;

As presented in FIG. 12B at the moment "t0" after the primary switch Q2, 108, turns off the current will continue to flow through the leakage inductance of the transformer Tr, 128, building up the voltage across Q2. The bidirectional switch formed by Q5 and Q6 is on and the leakage inductance starts resonating with Cc, 214, formed a resonant circuit with initial conditions. The current through the leakage inductance and Cc will ring and at t1 will become negative. This negative current is designed to overwhelm the output current minus the magnetizing current and force the current through SR2 to become negative. At the moment t2, SR2 turns off and the current will start flowing through Ms1, charging the capacitor Cs1. At this time the resonant circuit formed by Cc and leakage inductance changes because the capacitor Cs1 becomes a part of it being in series with the Cc. The resonant frequency changes and the current further rings through Cc, Cs1 and the leakage inductance becoming positive at the moment t2, when Ms1 and the bidirectional switch formed by Q5 and Q6 opens up forcing the current flowing through the leakage inductance to discharge the parasitic capacitance o Q1 towards zero and obtain zero voltage switching conditions for Q1.

At the moment "t3" after the primary switch Q1, 106, turns off the current will continue to flow through the leakage inductance of the transformer Tr, 128, building up the voltage across Q1. The bidirectional switch formed by Q5 and Q6 is on and the leakage inductance starts resonating with Cc, 214, formed a resonant circuit with initial conditions. The current through the leakage inductance and Cc will ring and at t4 will change polarity becoming positive. This positive current is designed to overwhelm the output current minus the magnetizing current and force the current through SR1 to become negative. At the moment t4, SR1 turns off and the current will start flowing through Ms2, charging the capacitor Cs2. At this time the resonant circuit formed by Cc and leakage inductance changes because the capacitor Cs2 becomes a part of it being in series with the Cc. The resonant frequency changes and the current further rings through Cc, Cs2 and the leakage inductance becoming negative at the moment t5, when Ms2 and the bidirectional switch formed by Q5 and Q6 opens up forcing the current flowing through the leakage inductance to discharge the parasitic capacitance o Q2 towards zero and obtain zero voltage switching conditions for Q2.

What is claimed is:

1. A DC-DC converter having a primary side and a secondary side and comprising:
    at least two primary switching devices on the primary side;
    a transformer with at least two secondary windings, each secondary winding having outer and inner terminals, outer terminals of the at least two secondary windings being directly connected to each other at a first connection point,
    at least two synchronous rectifiers on the secondary side, wherein each of the primary switching devices has a corresponding synchronous rectifier from the at least two synchronous rectifiers,
        wherein first leads of said at least two synchronous rectifiers are directly connected to each other at a second connection point,
        wherein each of second leads of said at least two synchronous rectifiers is directly connected to a corresponding one of the inner terminals of said at least two secondary windings, at third and fourth connection points, respectively,
        wherein each of the primary switching devices is configured to be off when a respectively-corresponding synchronous rectifier is on,
    one output inductor in series with an output capacitor, said output inductor operably connected between the first connection point and the second connection point, and
    an amplitude-controlled current injection circuit connected to said output inductor, at the first connection point,
        wherein the current injection circuit is configured to produce, in operation, a pulse of current of a first amplitude that is higher than a second amplitude, the second amplitude being a lowest amplitude of current passing through said output inductor,
            (i) to cause current through each synchronous rectifier to become zero or negative prior to a first time, the first time being a time when said synchronous rectifiers turn off, and
            (ii) to turn off said synchronous rectifiers prior to a second time, the second time being a time when respectively-corresponding primary switching devices are turned on.

2. The DC-DC converter of claim 1, configured to tailor (a) an amount of negative current through each of the at least two synchronous rectifiers and (b) a time delay between the first time and the second time, to turn corresponding primary switching devices on at zero voltage switching conditions.

3. The DC-DC converter of claim 1, wherein at least one of the at least two synchronous rectifiers is replaced by a diode.

4. The DC-DC converter of claim 1, wherein the amplitude-controlled current injection circuit includes:
    an active switch in series with an inductive element and at least one resonant capacitor, said switch configured to operate in a quasi-resonant mode,
        wherein said current injection circuit is configured to control an amplitude of injected current injected with a phase shift associated with time between a third time, at which said active switch turns on, and the second time.

5. The DC-DC converter of claim 4, wherein said inductive element is magnetically coupled with said output inductor.

6. A DC-DC converter having a primary side and a secondary side and comprising:
    at least two primary switching devices on the primary side;
    a transformer with a secondary winding;
    at least two synchronous rectifiers on the secondary side,
        wherein first leads of said at least two synchronous rectifiers are directly connected to each other at a first connection point,
        wherein each of second leads of said at least two synchronous rectifiers is directly connected to a corresponding terminal of said secondary winding, at second and third connection points, respectively,
    wherein each of the primary switching devices is configured to be off when a respectively-corresponding synchronous rectifier is on,
    at least two output inductors each having first and second terminals,
        wherein each of first terminals of the at least two output inductors is connected to a corresponding terminal of the secondary winding at the second and third connection points, respectively,
        wherein second terminals of the at least two output inductors are connected to one another at a forth connection point and further connected to an output capacitor at said fourth connection point,
        wherein said output capacitor is further connected to the first connection point,
    at least two amplitude-controlled current injection circuits connected across said at least two synchronous rectifiers,
        wherein each of said at least two current injection circuits, is configured to produce, in operation, a pulse of current of a first amplitude that is higher than a second amplitude, the second amplitude being a lowest amplitude of each of currents passing through said at least two output inductors,
            (i) to cause current through each synchronized rectifier to become zero or negative prior to a first time when said synchronous rectifiers turn off, and
            (ii) to turn off said synchronous rectifiers prior to a second time when respectively-corresponding primary switching devices are turned on.

7. The DC-DC converter of claim 6, configured to adjust (a) an amount of negative current through each of the at least two synchronous rectifiers and (b) a time delay between the first time and the second time, to turn corresponding primary switching devices on at zero voltage switching conditions.

8. The DC-DC converter of claim 6, wherein at least one of the at least two synchronous rectifiers is replaced by a diode.

9. The DC-DC converter of claim 6, wherein a first amplitude-controlled current injection circuit, from the at least two amplitude-controlled current injection circuits, includes:
- an active switch in series with an inductive element and at least one resonant capacitor, said active switch configured to operate in a quasi-resonant mode,
  - wherein said current injection circuit is configured to control an amplitude of injected current with a phase shift associated with a moment of time between a third time, at which said active switch turns on, and the second time.

10. The DC-DC converter of claim 9, wherein said first amplitude controlled current injection circuit, from the at least two amplitude-controlled current injection circuits, is configured to further control the amplitude of the injected current as a result of connecting auxiliary resonant capacitors in parallel with said at least one resonant capacitor through auxiliary active switches.

11. The DC-DC converter of claim 9, wherein said inductive element is magnetically coupled with an output inductor, from the at least two output inductors, to which said first current injection circuit is connected.

12. A DC-DC converter having a primary side and a secondary side and comprising:
- a transformer with at least one secondary winding,
- at least two primary switching devices on the primary side, and
- a bridge formed by sets of two synchronous rectifiers,
- wherein, in each set, the two synchronous rectifiers are connected in series,
- wherein, in each set, a drain of one synchronous rectifier is connected to a source of another synchronous rectifier at a corresponding first and second connection points,
- wherein the first and second connection points are further connected to corresponding ends of the secondary winding, and
- wherein said sets are connected to each other at the third and fourth connection points, the third connection point being a point at which drains of two synchronous rectifiers are connected, the fourth connection point being a point at which sources of two synchronous rectifiers are connected;
- at least one output inductor connected to the third point, said output inductor connected in series with an output capacitor which is further connected to the fourth point; and
- at least one amplitude-controlled current injection circuit connected to the third point, the current injection circuit configured to produce, in operation, a pulse of current of a first amplitude that is larger than a second amplitude, wherein the second amplitude is a lowest amplitude of current passing through said output inductor,
- to cause current through at least one synchronous rectifiers in a set of two synchronous rectifiers become zero at a first time that precedes a second time, the second time being a time when the at least two primary switching devices turn on.

13. The DC-DC converter of claim 12, configured to adjust (a) an amount of negative current through each of the two synchronous rectifiers in a set, and (b) a time delay between the first time and the second time,
- to turn on the at least two primary switching devices at zero voltage switching conditions.

14. The DC-DC converter of claim 12, wherein the amplitude-controlled current injection circuit includes:
- an active switch in series with an inductive element and at least one resonant capacitor, said switch configured to operate in a quasi-resonant mode,
  - wherein said current injection circuit is configured to control an amplitude of injected current with a phase shift associated with a moment of time between a third time, at which said active switch turns on, and the second time.

15. The DC-DC converter of claim 14, wherein the amplitude-controlled current injection circuit is further configured to control the amplitude of the injected current as a result of connecting auxiliary resonant capacitors in parallel with said at least one resonant capacitor through auxiliary active switches.

* * * * *